(12) United States Patent
Zosin et al.

(10) Patent No.: US 8,635,141 B2
(45) Date of Patent: *Jan. 21, 2014

(54) METHOD AND SYSTEM FOR MULTIPLE PORTFOLIO OPTIMIZATION

(75) Inventors: Leonid Alexander Zosin, Scarsdale, NY (US); Ananth Madhavan, San Francisco, CA (US); Ian Domowitz, New York, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,064

(22) Filed: Dec. 10, 2010

(65) Prior Publication Data
US 2011/0082815 A1 Apr. 7, 2011

Related U.S. Application Data

(63) Continuation of application No. 11/730,750, filed on Apr. 3, 2007, now Pat. No. 7,853,510, which is a continuation-in-part of application No. 10/640,630, filed on Aug. 14, 2003, now Pat. No. 7,337,137.

(60) Provisional application No. 60/448,147, filed on Feb. 20, 2003.

(51) Int. Cl.
*G06Q 40/00* (2012.01)
(52) U.S. Cl.
USPC ........................................................ 705/36 R
(58) Field of Classification Search
None
See application file for complete search history.

(56) References Cited

U.S. PATENT DOCUMENTS

| | | | |
|---|---|---|---|
| 5,806,049 A | 9/1998 | Petruzzi | |
| 5,873,071 A | 2/1999 | Ferstenberg et al. | |
| 6,003,018 A | 12/1999 | Michaud et al. | |
| 6,381,586 B1 | 4/2002 | Glasserman et al. | |
| 6,484,152 B1 * | 11/2002 | Robinson | 705/36 R |
| 6,820,069 B1 | 11/2004 | Kogan et al. | |
| 6,907,403 B1 | 6/2005 | Klein et al. | |

(Continued)

FOREIGN PATENT DOCUMENTS

EP 1351179 A1 7/2003
JP 2001076057 A 3/2001

OTHER PUBLICATIONS

Chambers et al.; Inter-Temporal Analysis and Optimization of Bank Portfolios; Management Science; vol. 7, Iss. 4, p. 393; Jul. 1961.*

(Continued)

*Primary Examiner* — Virpi Kanervo
(74) *Attorney, Agent, or Firm* — Rothwell, Figg, Ernst & Manbeck, PC

(57) ABSTRACT

Methods and systems for optimizing a plurality of portfolios, each portfolio including one or more shares of one or more tradable assets, and may include the steps of: receiving asset data associated with the plurality of the portfolios; receiving one or more optimization constraints including at least one global constraint defining a constraint to be applied across an aggregate of the plurality of portfolios; for each portfolio, optimizing the asset data based on the one or more optimization constraints to create optimized portfolio data; aggregating the optimized portfolio data to create aggregate optimized asset data; determining if the aggregate optimized asset data satisfies the at least one global constraint; and only if the at least one global constraint is satisfied, outputting the optimized asset data.

7 Claims, 9 Drawing Sheets

(56) References Cited

U.S. PATENT DOCUMENTS

| | | | |
|---|---|---|---|
| 6,928,418 B2 * | 8/2005 | Michaud et al. | 705/36 R |
| 7,039,608 B2 | 5/2006 | Johnson et al. | |
| 7,089,205 B1 | 8/2006 | Abernethy | |
| 7,171,385 B1 | 1/2007 | Dembo et al. | |
| 7,389,209 B2 | 6/2008 | Masiello et al. | |
| 7,472,084 B2 | 12/2008 | Damschroder | |
| 7,668,773 B1 | 2/2010 | Pruitt | |
| 7,720,738 B2 | 5/2010 | Thompson | |
| 2002/0091605 A1 | 7/2002 | Labe, Jr. et al. | |
| 2002/0097917 A1 * | 7/2002 | Nelson et al. | 382/239 |
| 2002/0184134 A1 | 12/2002 | Olsen et al. | |
| 2003/0101128 A1 * | 5/2003 | Abernethy | 705/37 |
| 2003/0195829 A1 * | 10/2003 | Oberuc | 705/36 |
| 2003/0233306 A1 | 12/2003 | Madhavan et al. | |
| 2004/0003132 A1 * | 1/2004 | Stanley et al. | 709/316 |
| 2004/0083150 A1 | 4/2004 | Michaud et al. | |
| 2004/0199448 A1 * | 10/2004 | Chalermkraivuth et al. | 705/36 |
| 2005/0071206 A1 | 3/2005 | Berge | |
| 2007/0150399 A1 * | 6/2007 | Young et al. | 705/36 R |
| 2010/0185557 A1 * | 7/2010 | Hunter et al. | 705/36 R |

OTHER PUBLICATIONS

Geoffrion, Arthur M.; Stochastic Programming with Aspiration or Frantic Criteria; Management Science; vol. 13, Iss. 9, p. 672; May 1967.*

Sharpe, William F.; A Simplified Model for Portfolio Analysis; Management Science; vol. 9, Iss. 2, p. 277; Jan. 1963.*

Best, M. J. et al., "On the Sensitivity of Mean-Variance-Efficient Portfolios to Changes in Asset Means; Some Analytical and Computational Results," The Review of Financial Studies 1991 vol. 4, No. 2, pp. 315-342.

Haugen, Robert; Finance From a New Perspective; Financial Management, Tampa; Spring 1996; vol. 25, Iss. 1; p. 86-12 pgs.

Terhaar, Kevin; Staub, Renato; Singer, Brian; Appropriate Policy Allocation for Alternative Investments; The Journal of Portfolio Management; Spring 2003; vol. 29, Iss. 3; pp. 101-110.

Anonymous; MarketSwitch Releases Real Time Offer Optimizer for Corporate Web Sites; DCI Conference Business Wire; Aug. 29, 2000, 2 pgs.

O'Cinneide, Colm; Scherer, Bernd; Xu, Xiaodong, Pooling Trades in a Quantitative Investment Process; the Journal of Portfolio Management; Summer 2006; vol. 32, No. 4; pp. 33-43.

Seow-Eng Ong and Ranasinghle. "Portfolio Variance and Correlation Matrices". Journal of Real Estate Portfolio Management, Boston: 2000. vol. 6, Issue 1; p. 1, 6 pgs.

R. E. Bailey, 2002, "Economics of Financial Markets,", Chapter 4, Portfolio Selectoin: The Mean-Variance Model, pp. 75-98.

Chopra, V. K., "Improving Optimization," The Journal of Investing, pp. 51-59, Fall 1993.

Chopra, V.K. et al., The Effect of Errors in Means, Variances, and Covariances on Optimal Portfolio Choice, The Journal of Portfolio Management, pp. 6-11, Winter 1993.

FinPortfolio.com—"Tutorial Asset Allocation," pp. 1-3, Copyright 1999-2001.

FinPortfolio.com—"Tutorial Efficient Frontier,"p. 1-2, copyright 1999-2001.

ILOG Optimization Suite, "Powering Your Decisions," ILOG Jun. 2002 pp. 1-6.

Kallberg, J.G., et al, "Mis-Specifications in Portfolio Selection Problems," Lecture Notes in Economics and Mathematical Systems, vol. 227, pp. 74-87, 1984.

Sharpe, W.F., "The Sharpe Ratio," pgs. The Journal of Portfolio Manager, Fall 1994, pp. 1-16.

* cited by examiner

METHOD AND SYSTEM FOR MULTIPLE PORTFOLIO OPTIMIZATION

CROSS REFERENCE TO RELATED PATENT DOCUMENTS

This application is a Continuation of and claims priority to U.S. patent application Ser. No. 11/730,750 filed Apr. 3, 2007, now U.S. Pat. No. 7,853,510 issuing Dec. 14, 2010, which was a Continuation-In-Part application of U.S. patent application Ser. No. 10/640,630, filed on Aug. 14, 2003, now U.S. Pat. No. 7,337,137 issued Feb. 26, 2008, which claimed priority to Provisional U.S. Patent Application No. 60/448,147, filed on Feb. 20, 2003; the entire contents of each of which are incorporated herein in their entirety.

BACKGROUND OF THE INVENTION

1. Field of the Invention

The present invention relates to methods and systems for optimization of a plurality of portfolios made up of tangible or intangible assets. More specifically, the present invention relates to methods and systems for optimization of multiple portfolios while applying portfolio constraints.

2. Discussion of the Background

Managers of assets, such as portfolios of stocks and/or other assets, often seek to maximize returns on an overall investment, such as, e.g., for a given level of risk as defined in terms of variance of return, either historically or as adjusted using known portfolio management techniques.

Following the seminal work of Harry Markowitz in 1952, mean-variance optimization has been a common tool for portfolio selection. A mean-variance efficient portfolio can be constructed through an optimizer with inputs from an appropriate risk model and an alpha model. Such a portfolio helps ensure higher possible expected returns (e.g., net of taxes and subject to various constraints) for a given level of risk.

Risk lies at the heart of modern portfolio theory. The standard deviation (e.g., variance) of an asset's rate of return is often used to measure the risk associated with holding the asset. However, there can be other suitable or more suitable measures of an asset's risk than its standard deviation of return. A common definition of risk is the dispersion or volatility of returns for a single asset or portfolio, usually measured by standard deviation. ITG Inc., the assignee of the present invention, has developed a set of risk models for portfolio managers and traders to measure, analyze and manage risk in a rapidly changing market. (See e.g., application Ser. No. 10/640,630). These models can be used to, among other things, create mean-variance efficient portfolios in combination with a portfolio optimizer, such as, e.g., those set forth herein.

According to modern portfolio theory, for any portfolio of assets (such as, e.g., stocks and/or other assets) there is an efficient frontier, which represents variously weighted combinations of the portfolio's assets that yield the maximum possible expected return at any given level of portfolio risk.

In addition, a ratio of return to volatility that can be useful in comparing two portfolios in terms of risk-adjusted return is the Sharpe Ratio. This ratio was developed by Nobel Laureate William Sharpe. Typically, a higher Sharpe Ratio value is preferred. A high Sharpe ratio implies that a portfolio or asset (e.g., stock) is achieving good returns for each unit of risk. The Sharpe Ratio can be used to compare different assets or different portfolios. Often, it has been calculated by first subtracting the risk free rate from the return of the portfolio, and then dividing by the standard deviation of the portfolio. The historical average return of an asset or portfolio can be extremely misleading, and should not be considered alone when selecting assets or comparing the performance of portfolios. The Sharpe Ratio allows one to factor in the potential impact of return volatility on expected return, and to objectively compare assets or portfolios that may vary widely in terms of returns.

By connecting a portfolio to a single risk factor, Sharpe simplified Markowitz's work. Sharpe developed a heretical notion of investment risk and reward—a sophisticated reasoning that has become known as the Capital Asset Pricing Model (CAPM). According to the CAPM, every investment carries two distinct risks. One is the risk of being in the market, which Sharpe called "systematic risk." Systematic risk can be reduced by diversification. The other risk, "unsystematic risk," is specific to a company's fortunes. These risks can also be mitigated through appropriate diversification. Sharpe discerned that a portfolio's expected return hinges solely on its "beta," its relationship to the overall market. The CAPM helps measure portfolio risk and the return an investor can expect for taking that risk.

Portfolio optimization often involves the process of analyzing a portfolio and managing the assets within it. Typically, this is done to obtain the highest return given a particular level of risk. Portfolio optimization can be conducted on a regular, periodic basis, e.g., monthly, quarterly, semi-annually or annually. Likewise, one can rebalance portfolios, which is accomplished ultimately by changing the composition of the assets in a portfolio, as often as is desired or necessary. Since one is not required to rebalance a portfolio each time one optimizes, one can optimize as frequently as desired. In considering rebalancing decisions, one typically also considers tax and/or transaction cost implications of selling and buying as one pursues an optimal portfolio.

In some existing portfolio optimizers, techniques such as "hill climbing" or linear/quadratic programming are used to find optimal solutions. However, when using these techniques issues such as long/short, minimum position size, position count constraints, tax costs, and transaction costs generally cannot be modeled accurately. In addition, U.S. Pat. No. 6,003,018, titled Portfolio Optimization By Means Of Resampled Efficient Frontiers, shows other optimizer methods. The entire disclosure of U.S. Pat. No. 6,003,018 is incorporated herein by reference. The present invention provides substantial improvement over these and other optimizers.

The present assignee has developed a portfolio optimizer, the ITG Opt™ optimizer, which uses mixed integer programming (MIP) technology to produce more accurate results than previously used optimization and rebalancing systems. In a prior version, the ITG Opt™ system performed optimization in a single pass, taking into account simultaneously all of the constraints and parameters. In that version and security characteristic could be constrained or introduced. In addition, a full range of portfolio characteristics could have been specified, including, for example, constraints on leverage, turnover, and long vs. short positions. Furthermore, constraints may be applied to an entire portfolio or to its long or short sides individually. Furthermore, the prior version of ITG Opt™ avoided misleading heuristics by combining a branch-and-bound algorithm with objective scoring of potential solutions, thus reducing the size of the problem without damaging the integrity of the outcome.

Additionally, the prior ITG Opt™ optimizer could accurately model and analyze implications associated with the tax code. For example, integer modeling of tax brackets and tax lots enables the ITG Opt™ optimizer to minimize net tax liability without discarding large blocks of profitable shares.

The prior ITG Opt™ is also adaptable to high in first out (HIFO), last in first out (LIFO), or first in first out (FIFO) accounting methods. In addition, the prior ITG Opt™ was designed with a focus on the real-world complexities of sophisticated investment strategies. The prior ITG Opt™ optimizer was able to handle complex and/or non-linear issues that could arise in real-world fund management.

Additionally, the prior ITG Opt™ optimizer was able to factor transaction costs resulting from market impact into its solutions. The optimizer included a cost model, ACE™, for forecasting market impact. The inclusion of ACE enabled users to weigh implicit transaction costs along with risks and expected returns of optimization scenarios.

Additionally, the prior ITG Opt™ optimizer used effective historical back-testing. The ITG Opt™ optimizer could closely track portfolios through time, accounting for the effects of splits, dividends, mergers, spin-offs, bankruptcies and name changes as they occur.

Additionally, the prior ITG Opt™ optimizer was equipped to handle many funds and many users. The prior ITG Opt™ optimizer included multi-user, client-server relational database management technology having the infrastructure to accommodate the demands of many simultaneous users and a large volume of transactions.

Additionally, the prior ITG Opt™ optimizer integrated neatly with trade-order management and accounting systems. Because the prior ITG Opt™ optimizer was built on relational database management technology it was easily linked with other databases. The prior ITG Opt™ optimizer could also generate trade lists for execution by proprietary TOM systems. Moreover, the prior ITG Opt optimizer design allowed for extensive customization of reports to fit a companies' operations and clients' needs. Moreover, custom report formats were able to be designed quickly and cost-effectively.

While a variety of portfolio optimization systems and methods, including prior versions of ITG Opt™ optimization system, may exist, there is a significant need in the art for systems and processes that improve upon the above and/or other systems and processes.

SUMMARY OF THE EMBODIMENTS

The various embodiments of the present invention significantly improve upon existing methods and systems.

According to embodiments of the present inventions, improved systems and methods are provided for the optimization of a plurality of portfolios which are composed of assets, either tangible or intangible, such as securities or stocks.

In an embodiment of the invention, a method is provided for optimizing a plurality of portfolios. Each portfolio includes one or more shares of one or more tradable assets. The method includes steps of: receiving asset data associated with the plurality of portfolios; receiving one or more optimization constraints including at least one global constraint defining a constraint to be applied across an aggregate of the plurality of portfolios; for each portfolio, optimizing the asset data based on the one or more optimization constraints to create optimized portfolio data; aggregating the optimized portfolio data to create aggregate optimized asset data; determining if the aggregate optimized asset data satisfies the at least one global constraint; and only if the at least one global constraint is satisfied, outputting the optimized asset data.

In another embodiment of the invention, a computer-readable storage medium is provided that has computer executable program code stored therein for optimizing a plurality of portfolios by performing the following operations: receiving asset data associated with the plurality of said portfolios; receiving one or more optimization constraints including at least one global constraint defining a constraint to be applied across an aggregate of the plurality of portfolios; for each portfolio, optimizing the asset data based on said one or more optimization constraints to create optimized portfolio data; aggregating said optimized portfolio data to create aggregate optimized asset data; determining if the aggregate optimized asset data satisfies the at least one global constraint; and only if the at least one global constraint is satisfied, outputting the optimized asset data.

In another embodiment of the invention, a system is provided for performing optimization of a plurality of portfolios of assets. The system may include a client interface configured to receive asset data associated with the plurality of the portfolios, to receive one or more optimization constraints including at least one global constraint defining a constraint to be applied across an aggregate of the plurality of portfolios, for each portfolio, to optimize the asset data based on the one or more optimization constraints to create optimized portfolio data, to aggregate the optimized portfolio data to create aggregate optimized asset data, to determine if the aggregate optimized asset data satisfies the at least one global constrain, and only if the at least one global constraint is satisfied, to output the optimized asset data.

The above and/or other aspects, features and/or advantages of various embodiments will be further appreciated in view of the following description in conjunction with the accompanying figures. Various embodiments can include or exclude different aspects, features, or advantages where applicable. In addition, various embodiments can combine one or more aspects, features, or advantages where applicable. The descriptions of the aspects, features, or advantages of a particular embodiment should not be construed as limiting any other embodiment of the claimed invention.

BRIEF DESCRIPTION OF THE DRAWINGS

The accompanying figures are provided by way of example, without limiting the broad scope of the invention or various other embodiments, wherein.

DETAILED DESCRIPTION OF THE EMBODIMENTS

The embodiments of the invention can be implemented on one or more computer(s) and/or one or more network of computer(s), such as a local area network (LAN), a wide area network (WAN), the Internet and/or another network. In various embodiments, one or more server(s), client computer(s), application computer(s) and/or other computer(s) can be utilized to implement one or more aspect of the invention. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc. Client computers may contain, in some embodiments, browser software for interacting with the server(s), such as, for example, using hypertext transfer protocol (HTTP) to make requests of the server(s) via the Internet or the like.

Figure 4:
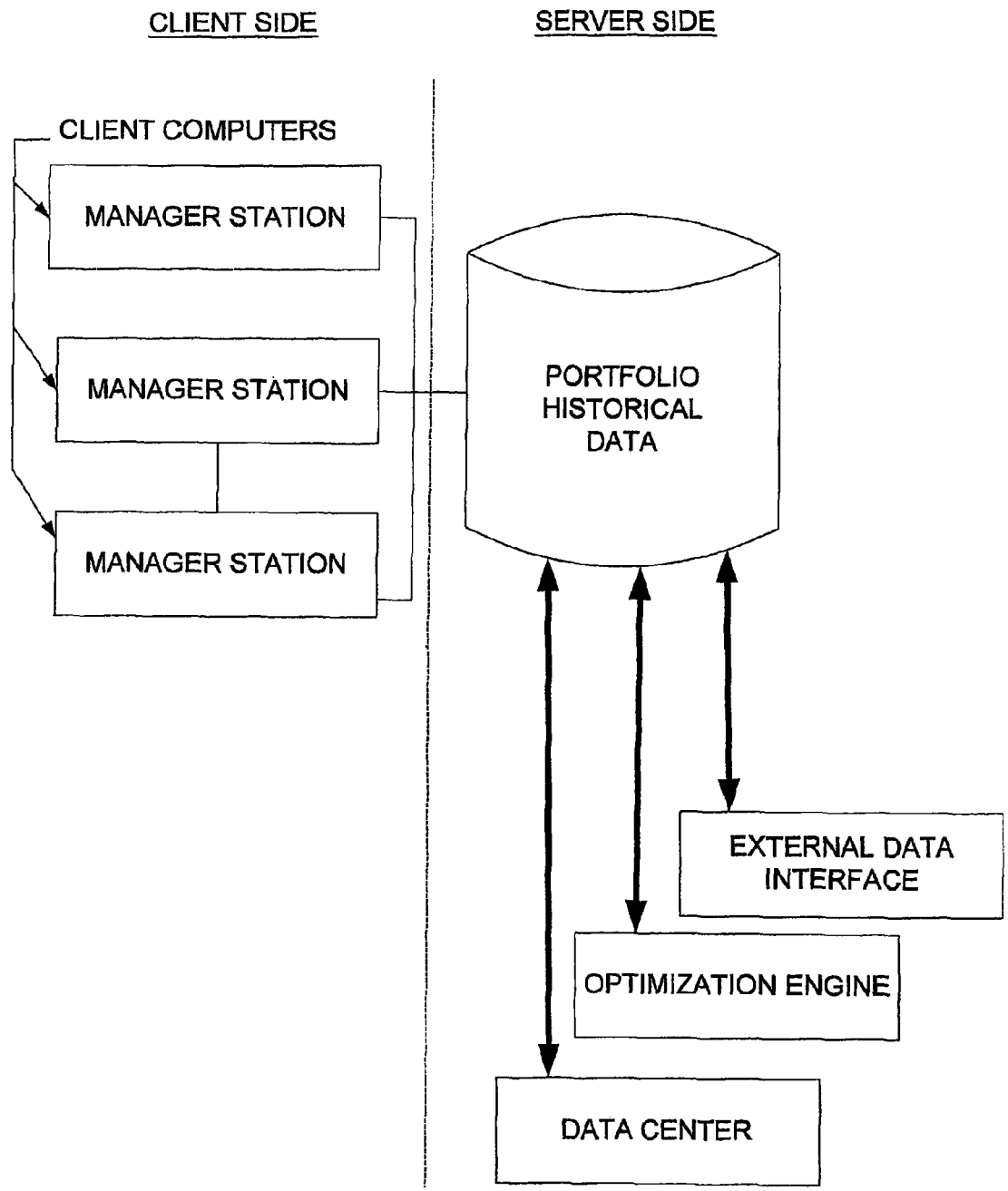
FIG. 4 illustrates computer system(s) that can be used to, among other things, implement process steps in various embodiments of the invention.

In some embodiments, the system can utilize relational databases, such as, e.g., employing a relational database management system (RDBMS) program to create, update and/or administer a relational database. The RDBMS may take Structured Query Language (SQL) statements entered by a user or contained in an application program and creates, updates and/or provides access to database(s). Some illustrative RDBMS's include ORACLE's database product line and IBM's DB2 product line. In some illustrative embodiments, as shown in FIG. 4, one or more client computers can be provided, such as, e.g., a LAN-based system. The client computer(s) can include an appropriate operating system, such as, for example, WINDOWS NT or another system. In some embodiments, the system is adapted to provide an object based graphical user interface (GUI).

In some embodiments, the system provides a multi-user client server system, such as shown in FIG. 4. In some embodiments, the system provides a hierarchical, object-based portfolio control structure for managing variants of a core set of strategies. In some embodiments, data based can include holdings, trades, prices, corporate actions and others. In some embodiments, multiple risk models may be employed, such as, e.g., BARRA, NORTHFIELD, custom models and others.

In some embodiments, portfolios include data objects, such as, e.g., holdings, historical executions, universe, benchmark, risk model, market data and/or others. In some embodiments, a universe of selected stocks can include, e.g., all of the relatively active securities in a relevant market or the like. Assuming, for example, that the U.S. market is the relevant market, then the universe of selected stocks may comprise, in some embodiments, approximately 8,000 stocks, including stocks from the New York Stock Exchange, the American Stock Exchange, the NASDAQ National Market, and some small cap stocks. Preferably, the specific objects in a portfolio can be defined by attributes and/or parameters that are set by a user. In some embodiments, an instance of a portfolio can be generated on the basis of an analysis date attribute, such as, in one illustrative example: a 3% S&P tracking portfolio with a Russell 1000 universe as of Jan. 1, 2003.

Figure 5:
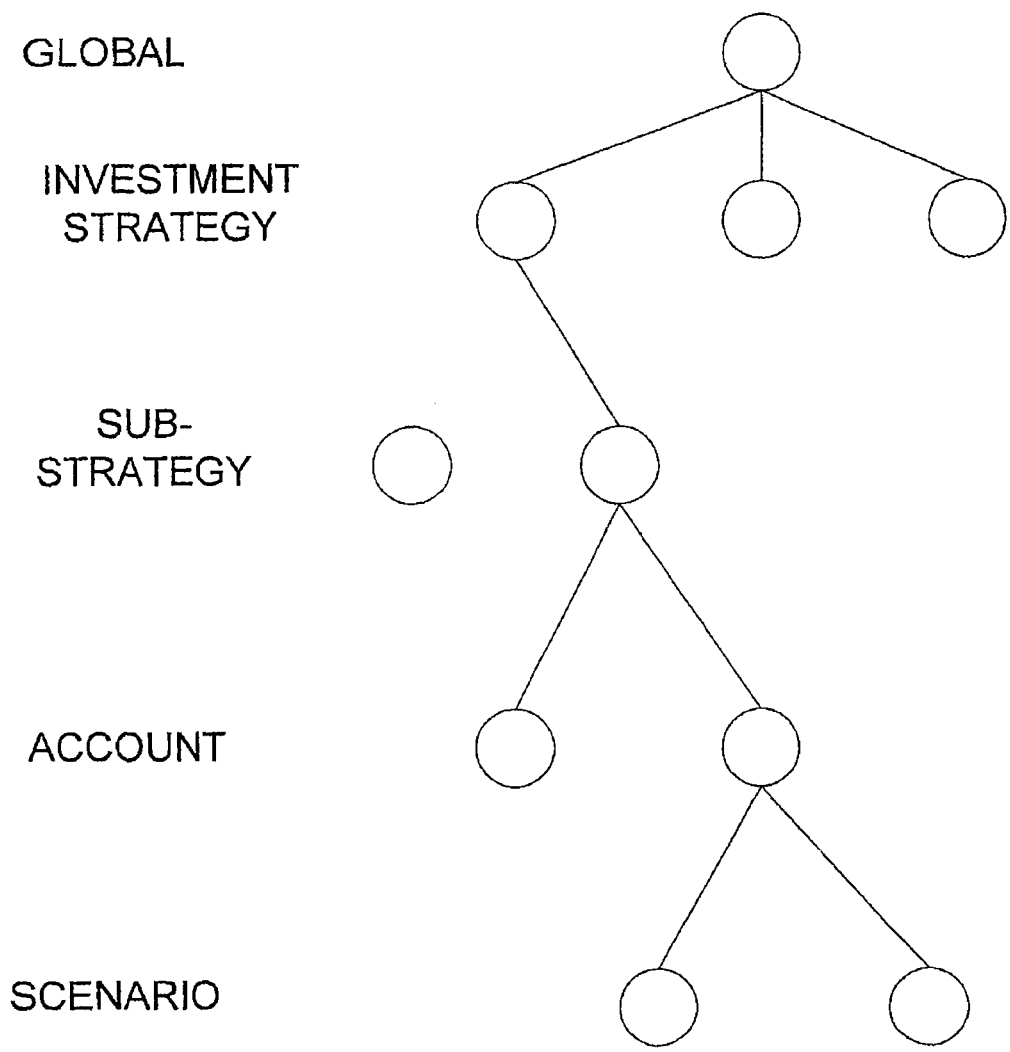
FIG. 5 illustrates a hierarchical, object-based portfolio control structure according to some embodiments.
Figure 6:
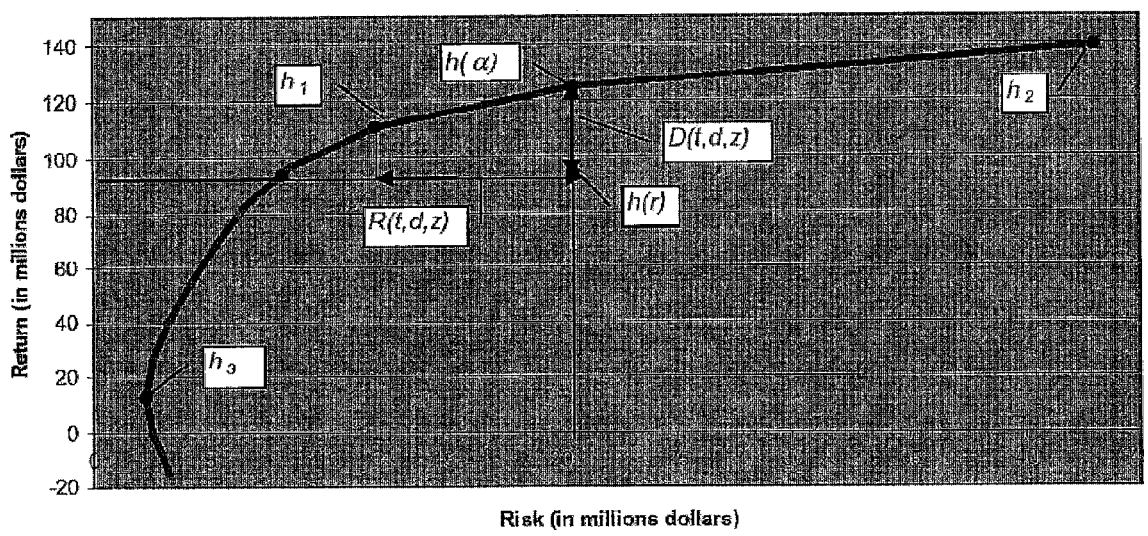
FIG. 6 is an illustrative graph of return (e.g., in millions of dollars) verses risk (e.g., in millions of dollars) for, e.g., finding an optimal portfolio.
Figure 7:
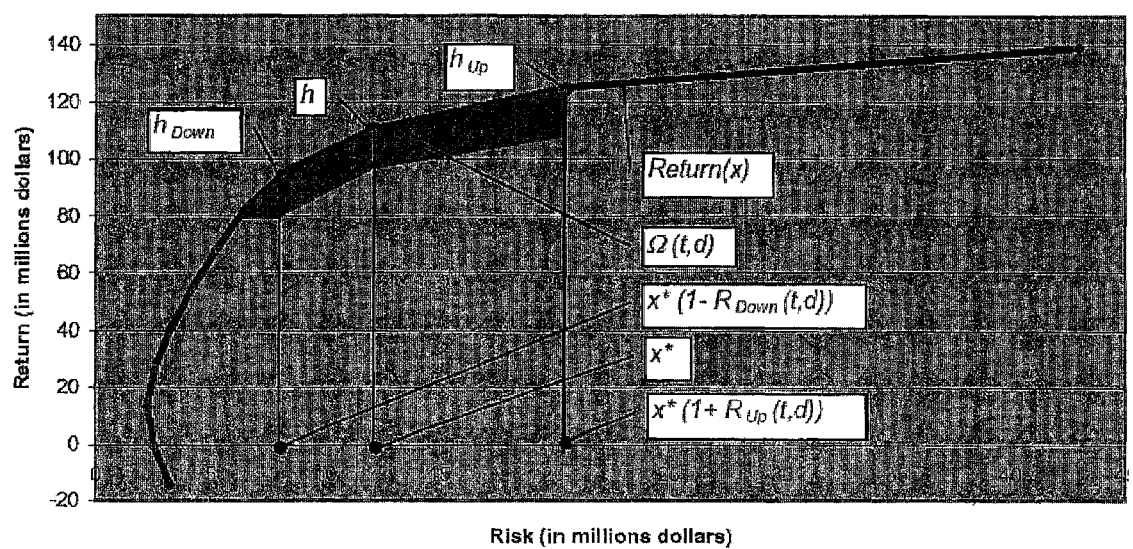
FIG. 7 is an illustrative graph of return (e.g., in millions of dollars) verses risk (e.g., in millions of dollars) showing, e.g., a set of mean-variance points that deviate from the mean-variance efficient frontier according to some illustrative embodiments of the invention.

In some embodiments, the portfolio database can include an attributes hierarchy, such as, for example, a five level hierarchy as illustratively shown in FIG. 5. In some illustrative embodiments, the lower levels may inherit attributes of higher levels. Additionally, the lower levels can preferably override inherited attributes.

In some embodiments, the portfolio database can include characteristics that can be, e.g., arbitrary stock specific data. Preferably, users can define characteristics, such as using formulas and/or rules to create new characteristics from other characteristics. As an illustrative example, a user could use algebraic creation methods, such as "A=B+C×D." As another illustrative example, a user could use set membership methods, such as, e.g., "A+1 if B<C and B>D." In some embodiments, filters can be provided to enable names to be removed from a universe for compliance and/or other reasons, such as, e.g., "remove sin stocks with p/e's>10 and price<5." In some embodiments, the system can provide default values for characteristics that are not specified.

In some embodiments, users can construct customized reports, such as, e.g., customized asset level reports. Preferably, report definitions can be named and stored (e.g., in digital data storage).

In some embodiments, any dimension of a portfolio "space" can be part of an objective function or constraint. In some embodiments, the system can facilitate the exploring of tradeoffs between any combinations of, for example: expected return; risk/tracking; exposures; transaction costs; taxes; position/trade counts/sizes; and others.

In some embodiments, one optimization can be provided with a universe in which both sides (e.g., buy and sell sides) are rebalanced subject to constraints on each side individually and for the portfolio as a whole.

In some embodiments, users are provided with a graphical user interface that is presented to the users via client computers. In some embodiments, the graphical user interface can enable importing and/or exporting of data and files, the setting of parameters, the running of the optimization and/or the acceptance of optimization results. In some embodiments, users can create or import specific task schedules in which, for example, import and/or export of data can be automated and functionality available in the user interface is available in batch processing.

Figure 1:
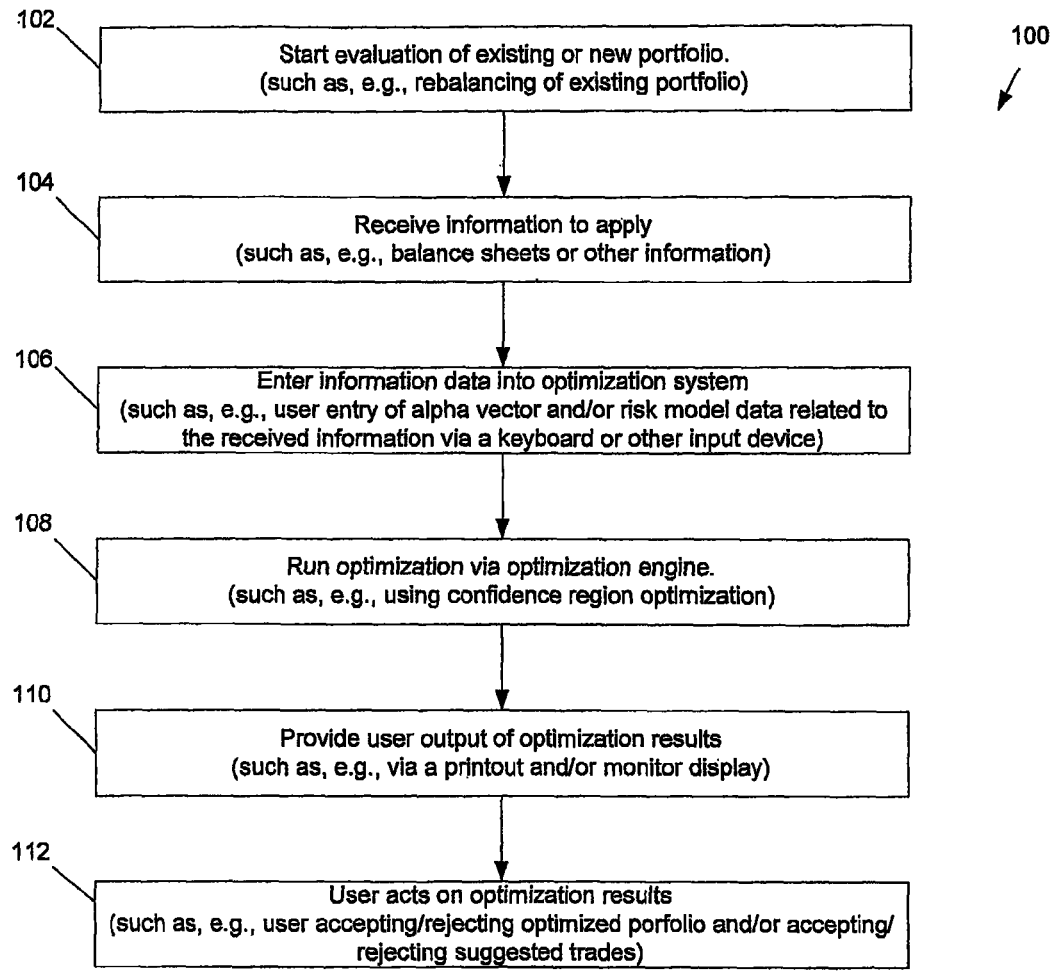
FIG. 1 is a flow diagram illustrating a process according to some embodiments of the invention.
Figure 2:
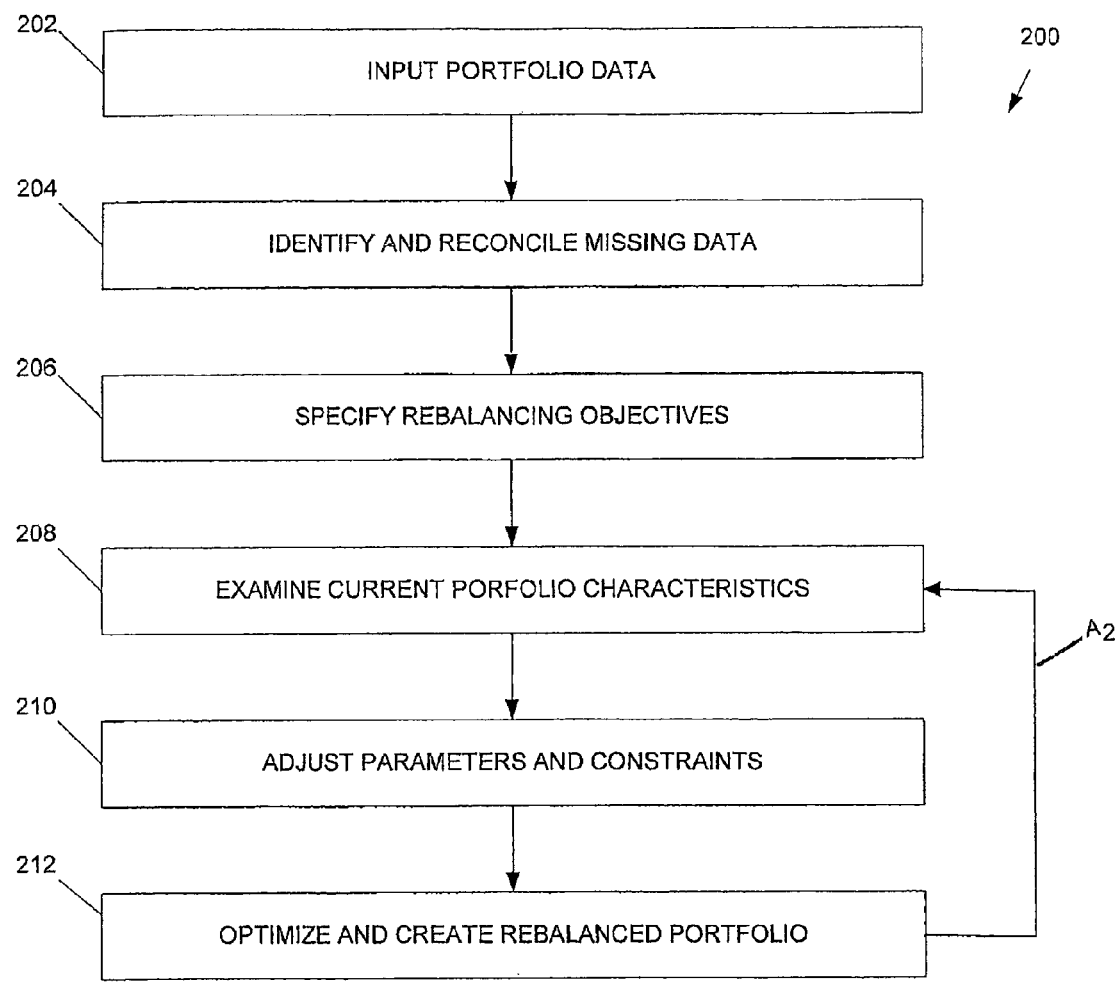
FIG. 2 is another flow diagram illustrating a process according to some embodiments of the invention.
Figure 3:
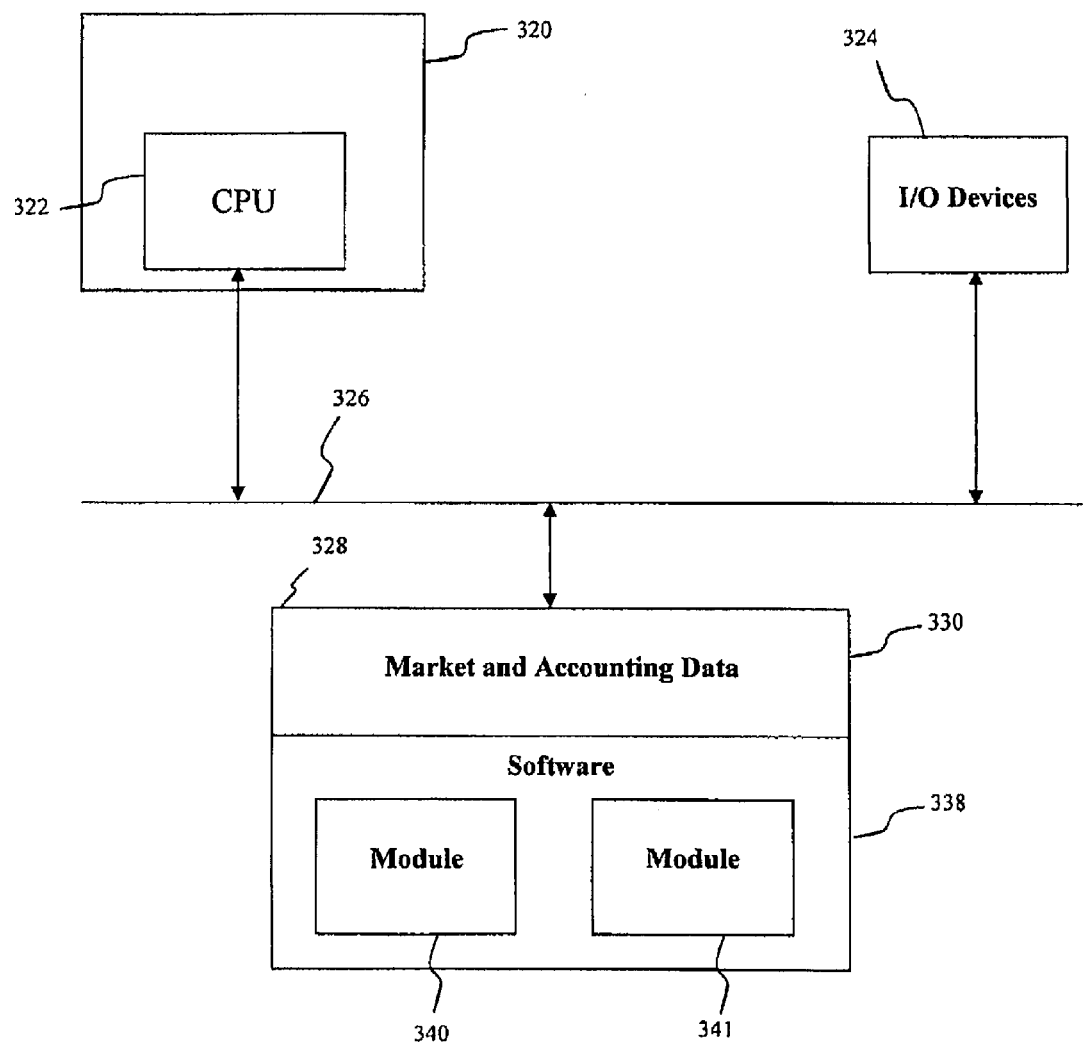
FIG. 3 illustrates computer(s) that can be used to, among other things, implement process steps in various embodiments of the invention.

FIG. 3 illustrates an example of a computer arrangement that can be used to implement computerized process steps, such as, e.g., within processes 100 and 200 shown in FIGS. 1 and 2. In some embodiments, computer 320 includes a central processing unit (CPU) 322, which can communicate with a set of input/output (I/O) device(s) 324 over a bus 326. The I/O devices 324 can include, for example, a keyboard, mouse, video monitor, printer, and/or other devices.

The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art.

Memory 328 can include, for example, market and accounting data 330, which can include, for example, data on stocks, such as, stock prices, and data on corporations, such as book value. The memory 328 can also store software 338. The software 338 can include a number of modules 340 for implementing the steps of processes, such as steps of the processes 100 and/or 200 shown in FIGS. 1 and 2. Conventional programming techniques may be used to implement these modules. Memory 328 can also store the above and/or other data file(s).

In some embodiments, the various methods described herein may be implemented via a computer program product for execution on one or more computer systems. For example, a series of computer instructions can be stored on a computer readable medium (e.g., a diskette, a CD-ROM, ROM or the like) or transmitted to a computer system via and interface device, such as a modem or the like. The medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

FIGS. 1 and 2 illustrate process steps that may be carried out in some illustrative embodiments of the invention. These two processes are illustrative and various embodiments of the invention can be applied in various processes.

With respect to the illustrative process 100 shown in FIG. 1, in a first step 102, the process initiates the evaluation of an existing or new portfolio. Then, in a second step 104, the system receives information to apply into the optimization analysis. Then, in a third step 106, information is entered into an optimization system, such as an optimization engine. Then, in a forth step 108, optimization algorithms and methodologies are executed via an optimization engine. Then, in a fifth step 110, optimization results are provided to a user. Then, in a sixth step 112, the user acts on the optimization results. For example, the user might, e.g., rebalance a portfolio based on the results.

With respect to the illustrative process 200 shown in FIG. 2, in a first step 202, a user can input portfolio data. In some embodiments, a user can create a portfolio with a portfolio name editor. Preferably, the user can load data as needed using file import/export utilities, such as, e.g.: identifier map; holdings, benchmarks, universes, characteristics, risk models and/or others. Preferably, a user can also define portfolio attributes with a parameter editor, such as, e.g.: analysis date; benchmark; universe; characteristics; risk model. Preferably, a user can also scrub data.

Then, at step 204, a user can identify and reconcile missing data. In some embodiments, a user can reconcile data from multiple sources. In some embodiments, some potential problems could include: changes in asset status or identifier; missing or erroneous characteristics or risk data; membership in benchmark or universe; and/or others. In some embodiments, a holdings summary report can provide high-level problem notification. In some embodiments, missing data reports can be used for: holdings; benchmark; universe; characteristics; factor exposures; and/or others. In some embodiments, a user can use data editors to fix problems.

Then, at step 206, a user can specify rebalancing objectives. In some embodiments, a user can select "standard" parameters using a parameter editor, such as, for example: cash flow; objective function (e.g., alpha, risk aversion); risk constraints (e.g., two or plural benchmarks, common factor and specific); cash balance, turnover constraints; position size, position count and/or trade size constraints; universe characteristics filter; and/or others. Preferably, a user can select user specific parameters for use in the processes of the present invention. Preferably, a user can construct a constraint matrix using row/column bounds editors.

Then, at step 208, a user can examine current portfolio characteristics. In some embodiments, a user can receive reports for one or more of: holdings, universe, benchmarks, final portfolio(s), and/or others. Preferably, a user can receive summary and detail related to: accounting, characteristics, factor exposure, trades, and/or others.

Then, at step 210, a user can adjust parameters and constraints. In some embodiments, a user can perform this step via a parameter editor. Preferably, a row/column bounds editor is provided.

Then, at step 212, a user can optimize and create a rebalanced portfolio. This step can utilize an optimization engine to optimize and create suggested portfolios/trades. Preferably, the user can then examine the suggested portfolio/trades via, for example, a trade summary screen or report, a trade detail report or the like. The user can then preferably edit the suggested portfolio/trades as needed. The user can then preferably incorporate suggested portfolios/trades into particular executions.

As shown by arrow A2, the user can repeat steps 208-212 as desired to continuously evaluate portfolios/trades, rebalance portfolios and the like.

In some embodiments of the invention, step 108 in the process shown in FIG. 1 and/or step 212 in the process shown in FIG. 2 can include optimization methodologies as described below. In order to implement these methodologies, in some embodiments an optimizer (created, e.g., via software or the like) can include software modules or the like that effect steps as set forth below.

In some embodiments of the invention, a portfolio optimizer can be provided that enables one to ascertain an acceptable region of error. This can be advantageous, e.g., to help avoid having an optimizer that might propose changes or trades to be made as a result of "noise" within various inputs, which could, potentially, result in numerous trades and various costs related thereto. In some embodiments of the present invention, with an understanding of approximately how noisy these inputs are, the system can discern how large a region a portfolio manager can remain within that is deemed to be acceptable.

In some embodiments, the optimizer can define a confidence region for a portfolio $P_0$ on the efficient frontier that corresponds to a risk aversion $\gamma$. In some embodiments, this region includes all portfolios P, such that $c_{low}*Risk(P_0)<Risk(P)<c_{high}*Risk(P_0)$ and $Ret(P)>c*Ret(P_{opt})$. Where $P_{opt}$ is a portfolio on the efficient frontier such that $Risk(P_{opt})=Risk(P)$. Additionally, $c_{low}$, $c_{high}$ and c are relative average deviations of decrease in risk, increase in risk and expected return of optimal portfolios that correspond to the risk aversion $\gamma$ and different vectors of returns. It can be assumed that vectors of returns are normally distributed around their mean. In some embodiments, a user is able to set a specific confidence level by setting different values for constants $c_{low}$, $c_{high}$ and c.

In the resampled efficient portfolio optimization of the '018 patent, discussed above, a confidence region is computed around a resampled efficient frontier portfolio $P_0$ and includes all portfolios with a value of variance relative to $P_0$ less than or equal to a value associated with a specified confidence level. There, a main point in the resampled efficient portfolio optimization is to compute resampled efficient frontier portfolios. The resampling process produces simulated returns that provide alternative inputs for a computing of efficient frontier portfolios. Resampled efficient frontier portfolios are the result of an averaging process across many possible efficient frontiers.

On the other hand, in some embodiments of the present invention, standard efficient frontier portfolios are used, rather than resampled efficient frontier portfolios. Among other things, an efficient frontier portfolio, in contrast to a resampled efficient frontier portfolio, can be defined as a portfolio with maximum expected return for a fixed value of risk. In many cases, it should not be appropriate to use a resampled efficient frontier. As merely one illustrative example, consider two assets with a correlation coefficient of zero, expected returns 10% and 20% and a standard deviation of returns 20%. The maximum return portfolio includes only second asset and its expected return will be 20%. The resampled portfolio, which corresponds to the maximum return point on the resampled efficient frontier, includes about 35% of the first asset and 65% of the second asset and its expected return is only about 16%.

Resampled efficient frontier portfolios are constructed by averaging many portfolios that were obtained through simulations. Therefore, in most cases, these portfolios include a large number of different assets. Among other things, there would be difficulties using such portfolios in cases where it is desirable to have an optimal portfolio with a limited number of assets from a universe.

Computing Confidence Region for the Mean-Variance Efficient Set In Some Embodiments:

I. Definitions and Assumptions:

In some embodiments, the main parameters of the mean-variance model in ITG Opt are α—the vector of assets expected returns and Σ—covariance matrix of the assets returns. These parameters can be estimated using historical data, analytical models, analysts' forecasts, or other methods. V. K. Chopra, "Mean-Variance Revisited: Near-Optimal Portfolios and Sensitivity to Input Variations," Journal of Investing, 1993, the entire disclosure of which is incorporated herein by reference, illustrates, among other things, that small changes in the input parameters can result in large change in composition of the optimal portfolio. M. Best and R. Grauer, "On the Sensitivity of Mean-Variance Efficient Portfolios to Changes in Asset Means: Some Analytical and Computational Results," Review of Financial Studies, 1991, the entire disclosure of which is incorporated herein by reference, discusses, among other things, the effect of changes in the vector of assets expected returns on the mean-variance efficient frontier and the composition of optimal portfolios. V. K. Chopra and W. T. Ziemba, "The Effect of Errors in Means, Variances and Covariances on Optimal Portfolio Choice," Journal of Portfolio Management, 1993 and J. G. Kallberg and W. T. Ziemba, "Mis-specification in Portfolio Selection Problems," Risk and Capital, ed. G. Bamberg and A. Spreman, Lecture Notes in Economics and Mathematical Sciences, 1984, the entire disclosures of which are incorporated herein by reference, discuss, among other things, the relative importance of errors in expected returns, specific variances and covariances of returns on the investor's utility function. The relative impact of errors in these parameters depends on the investor's risk tolerance. If risk aversion parameter is not too high, the errors in expected returns have much more significant impact on the utility function than errors in other parameters. There are two possible ways to model errors in α:

relative error model: $r_i = \alpha_i * (1 + d * z_i)$, where $r_i$ is a real expected return of the asset i, $\alpha_i$ is an estimated expected return of the asset i, d is a standard deviation of error and $z_i$ is a normal random variables with mean 0 and standard deviation 1;

absolute error model is: $r_i = \alpha_i + d * z_i$, where $r_i$ is a real expected return of the asset i, $\alpha_i$ is an estimated expected return of the asset i, d is a standard deviation of error and $z_i$ is a normal random variables with mean 0 and standard deviation 1.

According to the CAPM model, assets with higher returns have higher risk or higher variance of returns. Therefore, the errors in estimations of expected returns should be proportional to the values of the expected return. Taking into account the last observation, we consider in some embodiments the relative error model.

II. Confidence Region for the Mean-Variance Efficient Set:

Considering a standard portfolio optimization problem arising in some embodiments:

$$\max_{h \in Q}[\alpha^T h - \gamma * \text{Risk } (h)], \quad (1)$$

where γ is a risk aversion parameter, α is a vector of estimated expected returns, h is a vector of position dollars, Risk(h) is a risk function and Q is a set of feasible portfolios. If γ is close to infinity, the problem (1) is equivalent to the problem:

$$\max_{h \in Q}[-\text{Risk } (h)]. \quad (2)$$

If (is close to 0, the problem (1) is equivalent to the problem:

$$\max_{h \in Q} \alpha^T h. \quad (3)$$

"t" denotes a return versus risk tradeoff coefficient:

$$t = \frac{\alpha^T(h(1) - h(3))}{\alpha^T(h(2) - h(3))}, \quad (4)$$

☐
where h(1), h(2) and h(3) are optimal solutions for problems (1), (2) and (3) correspondingly.

Considering a modified optimization problem with a vector of real expected returns:

$$\max_{h \in Q}[r^T h - \gamma * \text{Risk } (h)], \quad (5)$$

☐
where r is a vector of real expected returns. Let h(r) be an optimal portfolio for the problem (5). If the real return vector is (, the return of this portfolio is (Th(r). We find an optimal portfolio h(( ) with respect to return vector (and with the same level of risk like h(r) has:

$$h(\alpha) = \text{Arg} \max_{\{h | h \in Q \land \text{Risk}(h) == \text{Risk}(h(r))\}} \alpha^T h. \quad (6)$$

☐ The relative difference in returns of portfolios h(r) and h(( ) is a function of t, d and z:

$$D(t, d, z) = \frac{\alpha^T(h(\alpha) - h(r))}{\alpha^T h(\alpha)}. \quad (7)$$

The relative difference in Risk of portfolios h(1) and h(r) is a function of γ, d and z:

$$R(t, d, z) = \frac{\text{Risk } (h(1)) - \text{Risk } (h(r))}{\text{Risk } (h(1))}. \quad (8)$$

The variable z is a normal random variable, so an expected relative return difference of portfolios h(r) and h(α) is a function of t, d:

$$\delta(t,d) = E_z(D(t,d,z)) \quad (9)$$

An optimal portfolio, that corresponds to a high-risk aversion, is close to the minimum variance portfolio, and is much less affected by errors in the expected return vector than an optimal portfolio, that corresponds to a low risk aversion. The function δ(t,d) is equal 0 when t is 0, and it is increasing with increasing of t. Similarly, the function δ(t,d) is equal 0 when d is 0, and it is increasing with increasing of d.

$R_{Up}$ denotes an expected relative increase in Risk:

$$R_{Up}(t,d) = E_z(-R(t,d,z) | R(t,d,z)<0), \quad (10)$$

And, we denote by $R_{Down}$ an expected relative decrease in Risk:

$$R_{Down}(t,d) = E_z(R(t,d,z) | R(t,d,z) \geq 0). \quad (11)$$

Function Return(x) describe a mean-variance efficient frontier for a vector of expected returns a and a risk function Risk(h), where value Return(x) is a return of an optimal portfolio with variance x. Now, for a given point (x*,Return (x*)) on the mean-variance efficient frontier, that corresponds to a tradeoff coefficient t, and for a standard deviation d, we define a set of points Ω(t,d):

$$\Omega(t,d) = \left\{(x,y) \;\middle|\; \begin{array}{l} x \leq x^*(1 + R_{Up}(t,d)), \\ y \geq \text{Return}(x^*(1 - R_{Down}(t,d)))*(1 - \delta(t,d)), \\ y \geq \text{Return}(x)*(1 - \delta(t,d)). \end{array}\right. \quad (12)$$

Intuitively, it will be a set of mean-variance points that deviate from the mean-variance efficient frontier not more than the most of the optimal portfolios that were obtained for different realizations of vector of expected returns.

III. Estimation of functions δ, $R_{Up}$ and $R_{Down}$:

It is possible, for example, estimate functions δ, $R_{Up}$ and $R_{Down}$ for all possible combinations of, e.g., 10 values of the tradeoff coefficient t with 10 values of the standard deviation of error d using Monte Carlo simulations. The results of the study can be, e.g., summarized in tables. Tables 1-3 below demonstrate some illustrative tabular results. In order to calculate, e.g., a function for specific values x and y of tradeoff and standard deviation we can find values t1 and t2 of the tradeoff and two values d1 and d2 of the standard deviation in the table such that t1≤x≤t2 and d1≤y≤d2.

TABLE 1

δ(t,d)

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0 | 0 | 0 | 0 | 0 | 0 | 0 | 0 | 0 | 0 | 0 | 0 | 0 |
| 0.1 | 0 | 0.0009 | 0.0060 | 0.0049 | 0.0076 | 0.0081 | 0.0111 | 0.0117 | 0.0129 | 0.0159 | 0.0168 | 0.0223 |
| 0.2 | 0 | 0.0063 | 0.0121 | 0.0222 | 0.0284 | 0.0301 | 0.0341 | 0.0399 | 0.0450 | 0.0500 | 0.0669 | 0.0769 |
| 0.3 | 0 | 0.0223 | 0.0299 | 0.0501 | 0.0584 | 0.0626 | 0.0616 | 0.0731 | 0.0830 | 0.0870 | 0.1061 | 0.1149 |
| 0.4 | 0 | 0.0313 | 0.0564 | 0.0828 | 0.0908 | 0.0850 | 0.0883 | 0.1012 | 0.1095 | 0.1162 | 0.1289 | 0.1339 |
| 0.5 | 0 | 0.0533 | 0.0890 | 0.1156 | 0.1124 | 0.1189 | 0.1189 | 0.1253 | 0.1421 | 0.1465 | 0.1482 | 0.1488 |
| 0.6 | 0 | 0.0702 | 0.1317 | 0.1521 | 0.1387 | 0.1443 | 0.1413 | 0.1519 | 0.1690 | 0.1746 | 0.1715 | 0.1669 |
| 0.7 | 0 | 0.0822 | 0.1686 | 0.1709 | 0.1610 | 0.1651 | 0.1652 | 0.1818 | 0.1851 | 0.1827 | 0.1818 | 0.1777 |
| 0.8 | 0 | 0.1079 | 0.1841 | 0.1917 | 0.1839 | 0.1909 | 0.1882 | 0.1958 | 0.1986 | 0.2066 | 0.2028 | 0.1975 |
| 0.9 | 0 | 0.1165 | 0.2312 | 0.2241 | 0.2130 | 0.2210 | 0.2173 | 0.2151 | 0.2200 | 0.2196 | 0.2139 | 0.2116 |
| 1 | 0 | 0.1337 | 0.2568 | 0.2453 | 0.2352 | 0.2477 | 0.2381 | 0.2436 | 0.2322 | 0.2391 | 0.2311 | 0.2281 |

TABLE 2

$R_{Up}$(t,d)

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0 | 0 | 0 | 0 | 0 | 0 | 0 | 0 | 0 | 0 | 0 | 0 | 0 |
| 0.1 | 0 | 0.0006 | 0.0241 | 0.0257 | 0.0383 | 0.0770 | 0.0245 | 0.0338 | 0.1565 | 0.1376 | 0.1030 | 0.054 |
| 0.2 | 0 | 0.0008 | 0.0320 | 0.0829 | 0.0921 | 0.1357 | 0.0491 | 0.0576 | 0.2209 | 0.2392 | 0.2091 | 0.116 |
| 0.3 | 0 | 0.0011 | 0.0368 | 0.1316 | 0.1831 | 0.1955 | 0.0771 | 0.0982 | 0.3479 | 0.3740 | 0.2861 | 0.162 |
| 0.4 | 0 | 0.0014 | 0.0633 | 0.2496 | 0.3143 | 0.2537 | 0.1166 | 0.1429 | 0.5006 | 0.4902 | 0.4130 | 0.24 |
| 0.5 | 0 | 0.0023 | 0.0774 | 0.3412 | 0.4422 | 0.3016 | 0.1539 | 0.1903 | 0.5502 | 0.6449 | 0.4607 | 0.297 |
| 0.6 | 0 | 0.0020 | 0.1120 | 0.4936 | 0.5382 | 0.3451 | 0.2075 | 0.2423 | 0.6771 | 0.7367 | 0.6053 | 0.393 |
| 0.7 | 0 | 0.0022 | 0.1812 | 0.6964 | 0.6233 | 0.3790 | 0.2419 | 0.3288 | 0.8383 | 0.8358 | 0.6330 | 0.424 |
| 0.8 | 0 | 0.0023 | 0.2569 | 0.8706 | 0.6753 | 0.4277 | 0.2824 | 0.4167 | 0.9068 | 0.8754 | 0.7830 | 0.532 |
| 0.9 | 0 | 0.0027 | 0.3305 | 0.9888 | 0.7399 | 0.4896 | 0.3213 | 0.4463 | 1.0404 | 0.9820 | 0.8205 | 0.586 |
| 1 | 0 | 0.0028 | 0.4009 | 1.1153 | 0.7796 | 0.5238 | 0.3772 | 0.5363 | 1.1867 | 1.0951 | 0.8720 | 0.68 |

TABLE 3

$R_{Down}$(t,d)

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0 | 0 | 0 | 0 | 0 | 0 | 0 | 0 | 0 | 0 | 0 | 0 | 0 |
| 0.1 | 0 | 0.0024 | 0.0400 | 0.0424 | 0.0393 | 0.0255 | 0.0249 | 0.0229 | 0.0274 | 0.0442 | 0.0925 | 0.2011 |
| 0.2 | 0 | 0.0024 | 0.0369 | 0.0390 | 0.0379 | 0.0309 | 0.0287 | 0.0247 | 0.0350 | 0.0880 | 0.1246 | 0.2080 |
| 0.3 | 0 | 0.0025 | 0.0314 | 0.0358 | 0.0270 | 0.0220 | 0.0204 | 0.0400 | 0.0436 | 0.0528 | 0.0979 | 0.1864 |

TABLE 3-continued $R_{Down}(t,d)$

| d | 0 | 0.05 | 0.15 | 0.25 | 0.35 | 0.45 | 0.55 | 0.65 | 0.75 | 0.85 | 0.95 | 1 |
|---|---|------|------|------|------|------|------|------|------|------|------|---|
| 0.4 | 0 | 0.0027 | 0.0323 | 0.0339 | 0.0258 | 0.0166 | 0.0162 | 0.0336 | 0.0324 | 0.0459 | 0.0883 | 0.1612 |
| 0.5 | 0 | 0.0029 | 0.0293 | 0.0285 | 0.0235 | 0.0177 | 0.0185 | 0.0200 | 0.0147 | 0.0297 | 0.0639 | 0.1428 |
| 0.6 | 0 | 0.0027 | 0.0255 | 0.0262 | 0.0212 | 0.0154 | 0.0139 | 0.0185 | 0.0289 | 0.0351 | 0.1261 | 0.1693 |
| 0.7 | 0 | 0.0031 | 0.0189 | 0.0224 | 0.0181 | 0.0108 | 0.0112 | 0.0166 | 0.0247 | 0.0251 | 0.0520 | 0.1088 |
| 0.8 | 0 | 0.0025 | 0.0131 | 0.0181 | 0.0135 | 0.0166 | 0.0085 | 0.0135 | 0.0189 | 0.0197 | 0.0774 | 0.1265 |
| 0.9 | 0 | 0.0024 | 0.0073 | 0.0139 | 0.0104 | 0.0143 | 0.0046 | 0.0108 | 0.0127 | 0.0143 | 0.0400 | 0.0882 |
| 1   | 0 | 0.0022 | 0.0040 | 0.0085 | 0.0066 | 0.0073 | 0.0027 | 0.0058 | 0.0089 | 0.0080 | 0.0320 | 0.0744 |

IV. A Constraints Set for Confidence Region:

For a given risk aversion parameter and a standard deviation d, it is possible to find an optimal portfolio h* for the problem (1). Now, we can compute a tradeoff coefficient t corresponding to h* and set up the following upper bound on portfolio risk:

$$\text{Risk}(h) \leq \text{Risk}(h^*)*(1+R_{Up}(t,d)). \quad (13)$$

In order to set up a lower bound on portfolio's expected return, the problem below should be solved:

$$h' = \text{Arg} \max_{\{h \in Q \wedge \text{Risk}(h) = \text{Risk}(h^*)*(1-R_{Down}(t,d))\}} \alpha^T h. \quad (14)$$

Using this solution, a constraint can be established:

$$\alpha^T h \geq \alpha^T h'*(1-\delta(t,d)). \quad (15)$$

Computation of Sharpe Ratio In Some Embodiments:

In some embodiments, an optimizer is provided that can provide an optimization of a portfolio of assets based on Sharpe Ratio as a measure of goodness. Preferably, the system can provide an ex-ante maximization based on expected return and expected risk. Rather than merely using the Sharpe Ratio in an ex-post manner looking backward, embodiments can provide a forward looking optimization based on the Sharpe Ratio. Thus, in some embodiments of the invention a unique form of portfolio optimization can be provided based on, e.g., the maximization of the Sharpe Ratio.

I. Definitions and Assumptions:

In some embodiments, the standard objective function is a maximum of a sum of the following terms multiplied by some coefficients over all portfolios h from a set Q (this set is defined by constraints imposed on the portfolio):

α(h)—the expected return of the final portfolio;

Risk(h)—the variance of return of the final portfolio (or of the difference between the final portfolio and a benchmark portfolio) divided by the basis of the portfolio;

TC(h)—the transaction cost of transition of the current portfolio into the final portfolio;

TaxCost(h)—the total tax liability after transition into the final portfolio;

Penalties(h)—the penalties for violation of some soft constraints and for realizing "almost-long-term" gains.

Preferably, in the optimal portfolio selection problem, we look for a portfolio that maximizes expected return with relatively low values of Risk, TC, TaxCost and Penalties. In that regard, we set a positive coefficient before α and negative coefficients before all other terms. We can group all terms but risk into one term, A(h), we can call it "adjusted return." This term represents a total return after accounting for all extra expenses. We can denote a coefficient before a risk term by −γ, where γ is a risk aversion parameter. This parameter can establish a trade-off between risk and return of a potential investment portfolio.

In some embodiments, an alternative objective function could be the maximization of the reward-to-variability ratio S of a potential investment portfolio h∈Q.

$$S(h) = \frac{A(h)}{\sqrt{\text{Risk}(h)}}.$$

This ratio is known as the Sharpe ratio or Sharpe's measure. In this case, Risk is the variance of return of the final portfolio. A variance of return of the difference between the final portfolio and a benchmark portfolio is not used as Risk for the Sharpe ratio. Additionally, while in the standard objective function, the Risk is divided by portfolio basis B, one shouldn't divide Risk by B in the Sharpe ratio.

II. Finding the Sharpe Ratio in Some Embodiments:

In some embodiments, it is possible to maximize $S^2$ instead of S. Accordingly, the square root of the Risk in the denominator is removed.

First, $A^2$ is replaced with its piece-wise linear approximation. In that regard, a lower and an upper bounds on A are located, such that a value of A, that maximizes S, lies between these bounds.

A. Algorithm Find Bounds:

In some embodiments, an algorithm find bounds is used. In some embodiments, the algorithm can include substantially the following:

- Find an optimal solution h* for the problem: $\max_{\{h \in Q\}} A(h)$;
- Set UpperBound = A(h*);
- Set LowerBound = A(h*)/2;
- Set S1 = A(h*)/sqrt(Risk(h*));
- Set flag = 1;
- Find an optimal solution h* for the problem:
  $\max_{\{h \in Q, A(h) - \text{LowerBound}\}} \text{Risk}(h)$;
- Set S2 = A(h*)/sqrt(Risk(h*));
- If (S2<S1) flag = 0;
- while (flag) {
  - LowerBound /= 2.0;
  - S1 = S2;
  - Find an optimal solution h* for the problem:
    $\max_{\{h \in Q, A(h) - \text{LowerBound}\}} \text{Risk}(h)$;
  - Set S2 = A(h*)/sqrt(Risk(h*));
  - If (S2<S1) flag = 0;
  - else UpperBound = LowerBound*2.0;
- }

In most cases during the above algorithm, a LP (linear program) is solved three times. This algorithm terminates with values LowerBound and UpperBound for lower and upper bounds on A respectively. A set of links is defined $I_1$, $I_2, \ldots, I_n$ to represent A and create a piece-wise linear approximation A2 for the $A^2$, where $I_1$=LowerBound and $I_n$=UpperBound. We set $I_{i+1}=I_i(1+b)$ for every i<n−1, and $I_n \le I_{n-1}(1+b)$, and the n should be chosen to satisfy these conditions. For a given relative error value (1+e) in approximation of $A^2$ by A2, we set $$b=2(e+\sqrt{e(e+1)}).$$

If, as merely one illustrative example, e=0.0002, then error in the approximation of $A^2$ is at most 1.0002 and the final error in S is at most 1.0001. In some embodiments, the value of e is a user-selected variable, which can be selected, e.g., via a computer input device.

It is now possible to find the maximum Sharpe ratio S. We set an initial value of S to the value of S1 from the previous algorithm.

B. Algorithm Find Sharpe Ratio:

In some embodiments, an algorithm find Sharpe Ratio is provided. In some embodiments, the algorithm can include substantially the following:

- Set LastS = 0;
- while(S − LastS > 0.001) {
  - Find an optimal solution h* for a problem:
    X = max$_{\{h \in Q\}}$ [A2(h) − S*S*Risk(h)];
  - Set LastS = S;
  - Set S = sqrt(S*S + X/Risk(h*))
- }

In some embodiments, the algorithm outputs an optimal value of a Sharpe Ratio S and a portfolio h* that achieves this ratio. In some embodiments, to decrease a computation time, optimization is started, in every iteration, from the optimal solution obtained in the previous iteration.

III. Convergence of the Method in Embodiments:

In the above algorithm "find bounds," the problem starts with maximum possible value of adjusted return. In some embodiments, this number is decreased by a factor of two at each step of the algorithm. In some embodiments, the algorithm terminates when the best value of a Sharpe Ratio, that corresponds to the current level of the adjusted return, is lower then the Sharpe Ratio at the previous iteration. In most cases, the maximum value of Sharpe Ratio is achieved with adjusted return between the maximum adjusted return and a half of the maximum adjusted return.

In the algorithm "find Sharpe Ratio," at each iteration, an updated guess of the maximum Sharpe Ratio value S is used. This is denoted by $S_i$, $h_i$ and $X_i$ the values of S, h* and X correspondingly that were obtained in ith iteration of the algorithm. Since $X_i$ is a maximum of the optimization problem in the iteration i for every portfolio h, we have $$A^2(h)-S_i^2\text{Risk}(h) \le X_i. \qquad (1)$$

By using an optimal portfolio $h_{i+1}$ from iteration i+1 into inequality (1), we get $$\frac{A^2(h_{i+1})}{\text{Risk }(h_{i+1})} \le S_i^2 + \frac{X_i}{\text{Risk }(h_{i+1})}. \qquad (2)$$

Now, the iteration i+1 is as follows:

$$A^2(h_{i+1}) - S_{i+1}^2 \text{ Risk }(h_{i+1}) = X_{i+1}, \qquad (3)$$

Where $$S_{i+1}^2 = S_i^2 + \frac{X_i}{\text{Risk }(h_i)}. \qquad (4)$$

Now, we substitute (4) into (3) and get:

$$\frac{A^2(h_{i+1})}{\text{Risk }(h_{i+1})} = S_i^2 + \frac{X_i}{\text{Risk }(h_i)} + \frac{X_{i+1}}{\text{Risk }(h_{i+1})}. \qquad (5)$$

Finally, taking (2) and (5) together we get:

$$\frac{X_i}{\text{Risk }(h_i)} \le \frac{X_i - X_{i+1}}{\text{Risk }(h_{i+1})}. \qquad (6)$$

From the last inequality, it is possible to conclude the following properties of the algorithm:

For every iteration i of the algorithm, we have $X_i \ge X_{i+1}$.

For every iteration i of the algorithm, we have Risk($h_i$) ≥ Risk($h_{i+1}$).

If $X_i/2 \le X_{i+1}$, then Risk($h_i$)/2 ≥ Risk($h_{i+1}$).

These properties illustrate that the algorithm converges at an exponential rate to the optimal value of Sharpe Ratio.

Multi-portfolio Optimization In Some Embodiments:

In some embodiments of the invention, the optimization system can address situations in which, for example, a portfolio manager manages portfolios for one or more clients, wherein the client(s) have different portfolios of assets. In some embodiments, the system is adapted to be able to rebalance portfolios on a large scale rather than only small scale (such as, e.g., individual scale) rebalancing. For instance, the system can rebalance on a large scale without having each individual have to make certain trades individually. Notably, while individual accounts may differ, they still often may have common assets within their portfolios.

In some embodiments, the system performs optimization on a smaller or individual basis (such as, e.g., on an account-by-account basis) and evaluates which results also satisfy multi-portfolio needs. Thus, certain embodiments can, essentially, optimize individual accounts, subject to an aggregate. Based on this optimization, the system can generate results providing optimized portfolios across multiple accounts—reducing potential transaction costs, reducing the frequency of required trades and/or providing other benefits.

I. Definitions and Assumptions:

The standard optimization problem in some embodiments involves maximizing a certain objective function $\Omega(h)$ over all portfolios h from a constraint set Q that is defined by constraints imposed on the portfolio. In multi-portfolio optimization, there are K portfolios such that for every portfolio $h_k$, k=1, ..., K, there is an objective function $\Omega_k(h_k)$ and a constraint set $Q_k$. In addition, the total portfolio $\Sigma_{k=1,K} h_k$ should satisfy a constraint set Q for the total portfolio.

$h_k^{Opt}$, k=1, ..., K, denotes a portfolio that maximizes value of the objective function $\Omega_k$ such that $h_k^{Opt} \in Q_k$. Many portfolio managers have, e.g., the following multi-portfolio optimization problem: find an optimal set of K portfolios $h_1, \ldots, h_K$ such that $\Sigma_{k=1,K} h_k \in Q$ and for every portfolio $h_k$ we have $h_k \in Q_k$ and value of $\Omega_k(h_k)$ is close to the optimal value $\Omega_k(h_k^{Opt})$. In some embodiments, two different measures of distance between $\Omega_k(h_k)$ and $\Omega_k(h_k^{Opt})$ may be used:

relative measure: minimize value of $$\frac{\Omega_k(h_k^{Opt}) - \Omega_k(h_k)}{\Omega_k(h_k^{Opt})};$$

absolute measure: minimize value of $$\Omega_k(h_k^{Opt}) - \Omega_k(h_k).$$

In cases where a portfolio manager desires to make value of the objective function of each portfolio to be close to its maximum values in percents, the relative measure can be used. Alternatively, in cases where a portfolio manager desires to make these values to be close in dollars, the absolute measure can be used.

II. Algorithm for Multi-Portfolio Optimization:

In some embodiments, an algorithm for multi-portfolio optimization can include substantially the following:

In a first step of the algorithm, it is possible to find an optimal portfolio $h_k^{Opt} \in Q_k$ for every k, k=1, ..., K.

In a second step of the algorithm, it is possible to distinguish between two cases:

relative measure: maximize value of scalar variable x under the following constraints $$\Omega_k(h_k) \geq \Omega_k(h_k^{Opt}) * x, \quad \forall k \in \{1, \ldots, K\},$$
$$h_k \in Q_k, \quad \forall k \in \{1, \ldots, K\},$$
$$\sum_{k=1}^{K} h_k \in Q;$$

absolute measure: minimize value of scalar variable y under the following constraints $$\Omega_k(h_k) + y \geq \Omega_k(h_k^{Opt}), \quad \forall k \in \{1, \ldots, K\},$$
$$h_k \in Q_k, \quad \forall k \in \{1, \ldots, K\},$$
$$\sum_{k=1}^{K} h_k \in Q.$$

For the relative measure case, it is assumed that the value of $\Omega_k(h_k^{Opt})$ is positive. Where it is negative, the value of the variable x is minimized instead of maximized.

Additionally, the invention as claimed can optimize a plurality of portfolios subject to global constraints. This optimization may take multiple rounds in order to reach an acceptable solution given the applicable constraints. One embodiment of the invention is illustrated in FIG. 8, with further detail shown in FIG. 9.

Figure 8:
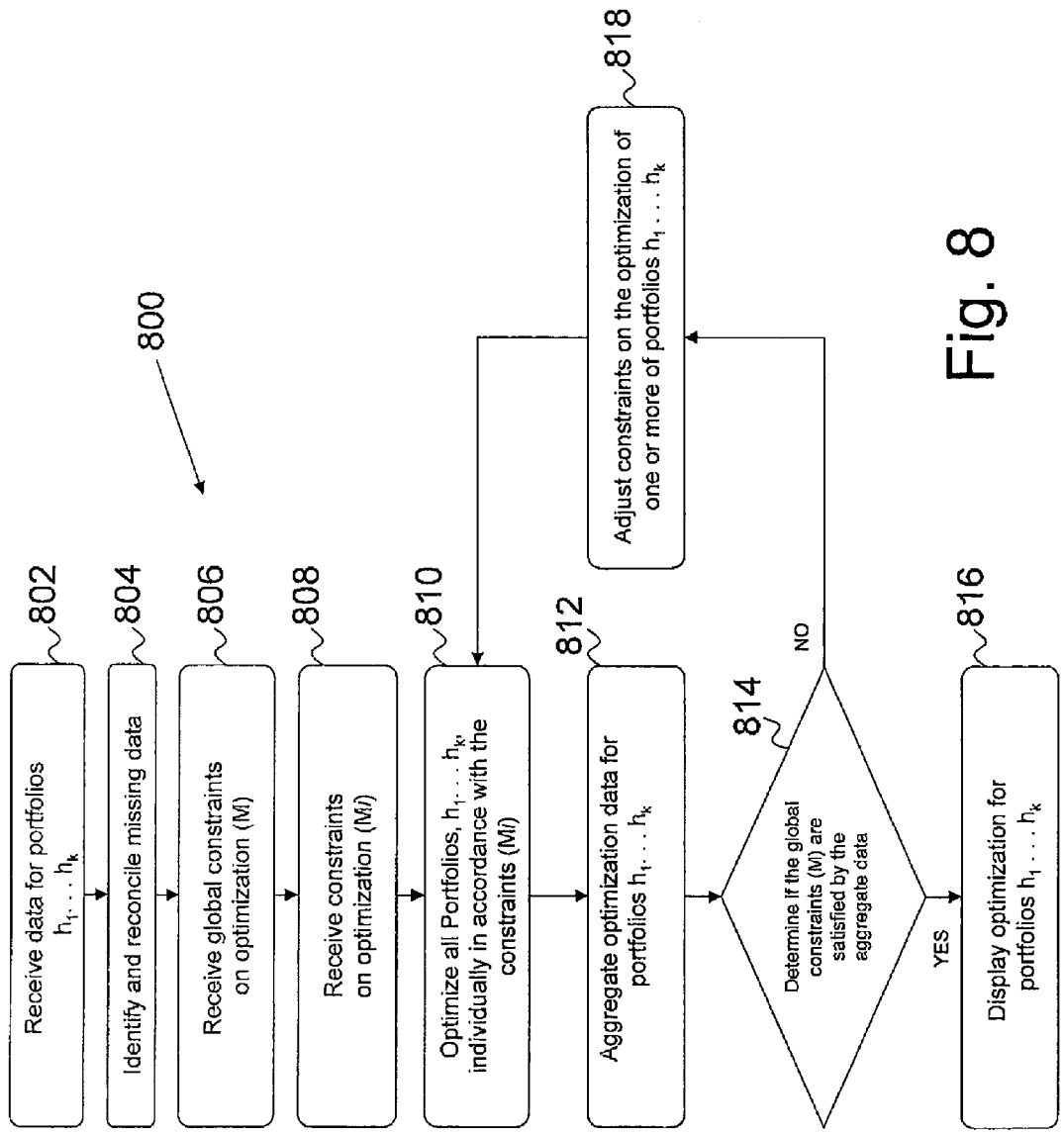
FIG. 8 is flow diagram illustrating the process of optimization of multiple portfolios.

FIG. 8 is a flow diagram illustrating one example of the method and system of the current invention. In process 800, the system receives data for a plurality of portfolios at step 802. The system then performs a check to ensure that all necessary data is present and correct at step 804. The system then receives global constraints at step 806. These constraints are to be considered in optimizing the total plurality of portfolios. Some global constraints that might be used would relate to, but are not limited to: total assets traded (percentage, number, monetary), total assets sold (percentage, number, monetary), total assets bought (percentage, number, monetary), acceptable risk levels, transaction costs, late comers, and crossing.

Next, at step 808, the system receives constraints to be used in optimizing the individual portfolios. The system then optimizes the portfolios independently using the constraints on individual portfolios at step 810. This newly optimized asset data is then aggregated at step 812, and the aggregated optimization asset data is checked to determine if it is within the bounds of the global constraints at step 814. If the aggregate optimized asset data satisfies the global constraints, the optimized asset data for each portfolio is displayed at step 816. However, in the event that the aggregate optimized asset data fails to satisfy the global constraints, the constraints on the individual portfolios are adjusted at step 818 and the optimization is rerun beginning with step 810. This process continues interactively until such time that the aggregate optimized asset data satisfies the global constraints.

The following example illustrates non-limiting aspects of the present which:

Three portfolios (h), each having 3 securities (S) to be traded:

$h_1$: $S_1, S_2, S_3$
$h_2$: $S_1, S_2, S_4$
$h_3$: $S_1, S_5, S_6$

The optimization of these three portfolios is subject to the following global constraints ($M_{TOTAL}$):

$M_{TOTAL-1}$: $S_1 \leq 100$ Shares Traded
$M_{TOTAL-2}$: $S_2 \leq 100$ Shares Traded
$M_{TOTAL-3}$: Total Trade Cost $\leq \$200$ The optimization of these three portfolios is subject to the following individual constraints ($M_1$). For the purposes of explanation and example, the constraints are identified according to the scheme: $M_{PORTFOLIO\text{-}CONSTRAINT\ NUMBER}$. While in this example the individual constraints mirror the global constraints, this is only one example of an embodiment. Another embodiment might have individual portfolio constraints that do not mirror the global constraints in either matter, i.e. securities, or amount, i.e. shares. Another embodiment might have individual constraints both mirroring and different from the global constraints, in part or in whole. In this example, the individual constraints are shown below:

$M_{1-1}$: $S_1 \leq 100$ Shares Traded
$M_{1-2}$: $S_2 \leq 100$ Shares Traded
$M_{1-3}$: Total Trade Cost $200
$M_{2-1}$: $S_1 \leq 100$ Shares Traded
$M_{2-2}$: $S_2 \leq 100$ Shares Traded
$M_{2-3}$: Total Trade Cost $\leq \$200$
$M_{3-1}$: $S_1 \leq 100$ Shares Traded
$M_{3-2}$: $S_2 \leq 100$ Shares Traded
$M_{3-3}$: Total Trade Cost $\leq \$200$ If each portfolio were optimized, individually a possible outcome could be, assuming all other aspects of the example are in order:

$h_1$
$S_1$=100 Shares Traded
$S_2$=100 Shares Traded
$S_2$=100 Shares Traded
Total Trade Cost=$100

$h_2$
$S_1$=100 Shares Traded
$S_2$=100 Shares Traded
$S_4$=100 Shares Traded
Total Trade Cost=$10

$h_3$
$S_1$=100 Shares Traded
$S_6$=100 Shares Traded
$S_5$=100 Shares Traded
Total Trade Cost=$10

While these individual portfolio optimizations meet the constraints placed on the individual portfolios, the aggregated asset data must still be checked to determine if the global constraints have been satisfied. The aggregated optimization data is as follows:

300 Shares $S_1$ Traded
200 Shares $S_2$ Traded
100 Shares $S_3$ Traded
100 Shares $S_4$ Traded
100 Shares $S_5$ Traded
100 Shares $S_6$ Traded
Total Trade Cost=$300

Thus, the number of $S_1$ and $S_2$ shares that were traded across all of the portfolios exceeded the aggregate number of shares the portfolio manager intended to trade. Further, the cost of the trades across all of the portfolios exceeds the maximum intended trade cost of the portfolios as a whole.

Therefore, where aggregate constraints may be imposed on multi-portfolio optimization, the system can adjust the constraints on the individual portfolios and rerun the optimization.

Figure 9:
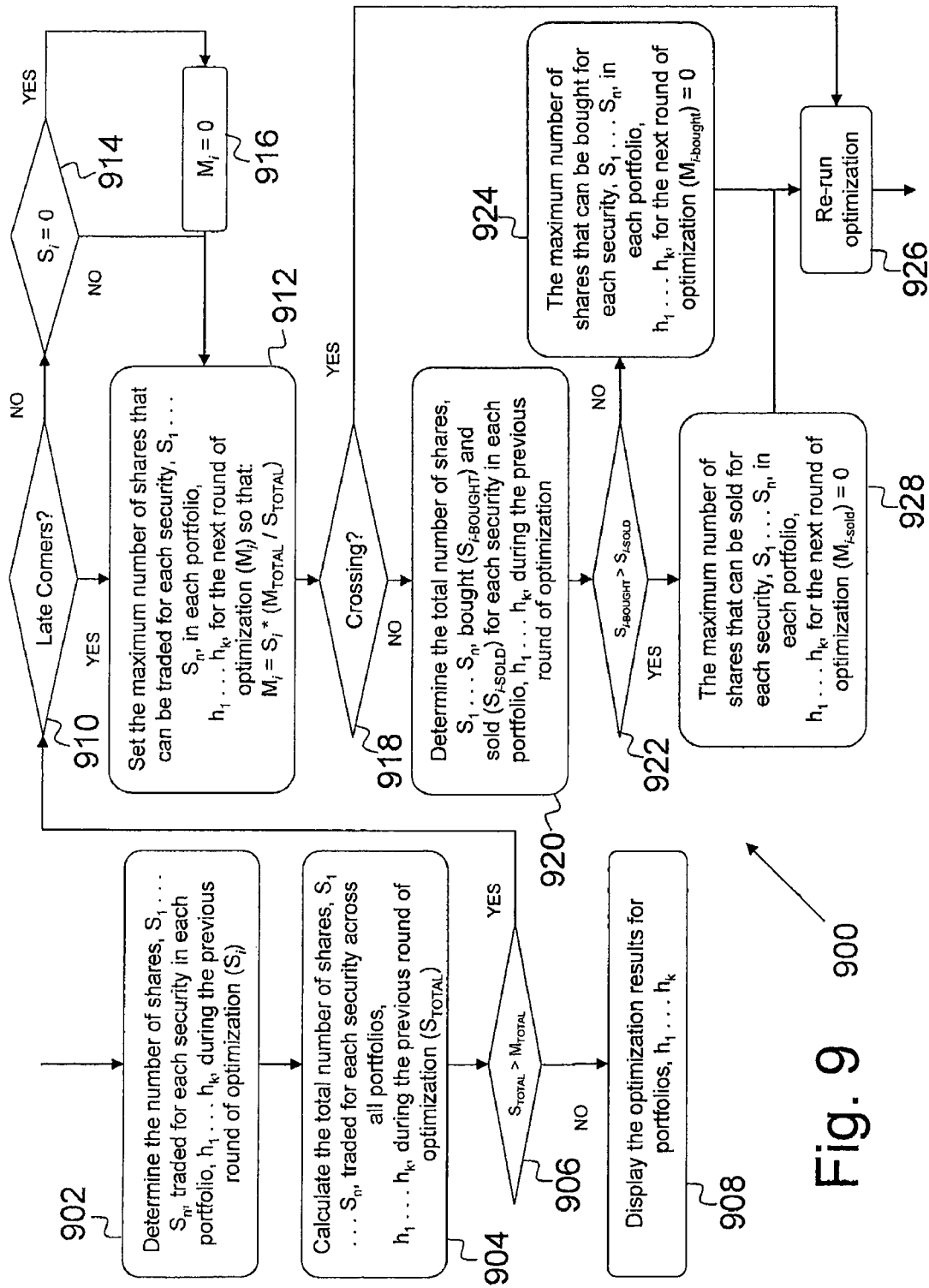
FIG. 9 is a flow diagram illustrating the adjusting of constraints during subsequent rounds of multiple portfolio optimization.

FIG. 9 is a flow diagram that illustrates an example of how the current invention may adjust the individual portfolio constraints. At step 902, a determination is made of how many of each share was traded in each portfolio during the previous round of optimization ($S_i$). These individual share amounts are summed in order to determine the aggregate number of shares traded across all of the portfolios ($S_{TOTAL}$) 904.

This aggregate optimization asset data is checked against the applicable global constraints ($S_{TOTAL}>M_{TOTAL}$) at step 906. If the constraints are met, the optimized asset data is displayed at step 908. In the event that the global constraints are not satisfied in step 906, the system may adjust the constraints placed on the individual portfolio optimizations in the following manner. A determination if "late comers" are allowed is made at step 910.

Allowing "late comers" would allow securities that were not traded in a particular portfolio during the previous round of optimization to be traded in current round of optimization. If "late comers" are not allowed, the system must check to see if each security was traded during the previous round of optimization at step 914. If the security was not traded during the previous round of optimization the maximum number of shares that can be traded of that security in the next round of optimization ($M_i$) is set equal to zero at step 916. If the security was traded during the previous round of optimization, the maximum number of shares that can be traded of that security in a particular portfolio during the next round of optimization ($M_i$) is set equal to the number of shares traded for that security in each portfolio during the previous round of optimization multiplied by the global constraint on the number of shares that can be traded for a security across all the portfolios divided by the aggregate number of shares that were traded for a security across all the portfolios during the previous round of optimization [$S_i*(M_{TOTAL}/S_{TOTAL})$] at step 912.

Next the system checks to see if "crossing" is permitted at step 918. "Crossing" occurs when an individual stock is both bought and sold across the multiple portfolios being optimized. If "crossing" permitted, than the optimization is rerun with the adjusted constraints at step 926. If "crossing" is not permitted then a determination of the aggregate number of shares of a particular security bought ($S_{i\text{-}BOUGHT}$) and sold ($S_{i\text{-}SOLD}$) across all of the optimized portfolios must be determined at step 920.

It is determined at step 922 whether the aggregate number of shares of a particular security bought ($S_{i\text{-}BOUGHT}$) is greater than the aggregate number of shares of a particular security sold ($S_{i\text{-}SOLD}$). If so, then the maximum number of shares that can be sold for that security during the next round of optimization is set to zero at step 928. If the aggregate number of shares of a particular security bought ($S_{i\text{-}BOUGHT}$) is less than the aggregate number of shares of a particular security sold ($S_{i\text{-}SOLD}$), then the maximum number of shares that can be bought for that security during the next round of optimization is set to zero at step 924. In one embodiment, when a buy or sell side is set to zero to prevent "crossing," the adjusted constraints to be used during subsequent optimization rounds relate only to the buy or sell side which is not set to zero. Finally, the optimization is rerun (step 926) using the adjusted constraints.

Referring back to the example begun with reference to FIG. 8, in which both the number of $S_1$ and $S_2$ shares traded and the cost of the trades exceeded the trader's intended limits, the constraints on the individual portfolios are now adjusted as follows.

Assuming "late comers" and "crossing" are both permitted the adjustment might be the following. Using the formula from FIG. 9, $M_i=S_i*(M_{TOTAL}/S_{TOTAL})$, the following calculations yield the maximum number of shares that can be traded of each security in the next round of optimization.

$M_{1\text{-}1}$: $S_1 \leq 33$ Shares Traded [100*(100/300)]
$M_{1\text{-}2}$: $S_2 \leq 50$ Shares Traded [100*(100/200)]
$M_{1\text{-}3}$: Total Trade Cost≤$200
$M_{2\text{-}1}$: $S_1 \leq 33$ Shares Traded [100*(100/300)]
$M_{2\text{-}2}$: $S_2 \leq 50$ Shares Traded [100*(100/200)]
$M_{2\text{-}3}$: Total Trade Cost≤$200
$M_{3\text{-}1}$: $S_1 \leq 33$ Shares Traded [100*(100/300)]
$M_{3\text{-}2}$: $S_2 \leq 50$ Shares Traded [100*(100/200)]
$M_{3\text{-}3}$: Total Trade Cost≤$200

Therefore, the next round of optimization might yield an outcome like the following:

$h_1$
$S_1$=33 Shares Traded
$S_2$=50 Shares Traded
$S_3$=100 Shares Traded
Total Trade Cost=$61
$h_2$
$S_1$=33 Shares Traded
$S_2$=50 Shares Traded
$S_4$=100 Shares Traded
Total Trade Cost=$61
$h_3$
$S_1$=33 Shares Traded
$S_5$=100 Shares Traded
$S_6$=100 Shares Traded
Total Trade Cost=$78

The aggregate data for the current round of optimization satisfies all of the global constraints. The total trade cost was reduced to a lower level which satisfies the global constraint due to the difference in the number of shares traded of each security. The satisfactory aggregate data is shown below:

$S_1$=99 Shares Traded
$S_2$=100 Shares Traded
$S_3$=100 Shares Traded
$S_4$=100 Shares Traded
$S_5$=100 Shares Traded
$S_6$=100 Shares Traded
Total Trade Cost=$200

Therefore, by adjusting the constraints in accordance with the claimed invention the optimization was able to adjust the constraints on individual portfolio optimization in order to satisfy global constraints place on the plurality of portfolios as a whole.

III. Optimal Solution and Solving Time:

The optimal set of portfolios $h_1, \ldots, h_K$, which is computed by the algorithm above, minimizes the value of the maximum relative or absolute distance of the value of the function $\Omega_k(h_k)$ from the value $\Omega_k(h_k^{Opt})$, where maximum is taken over all portfolios $h_1, \ldots, h_K$. This set also satisfies the constraint on the total portfolio $\Sigma_{k=1,K} h_k$. Therefore, the solution satisfies the properties required by portfolio managers in multi-portfolio optimization.

While illustrative embodiments of the invention have been described herein, the present invention is not limited to the various embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

We claim:

1. A computer-implemented method for optimizing a plurality of portfolios, each portfolio of said plurality of portfolios including one or more shares of one or more tradable assets, the method comprising the steps of:
   a) receiving, by a computer server, from an electronic trading system, asset data associated with said each portfolio of said plurality of portfolios;
   b) receiving, by said computer server, an individual optimization constraint, wherein the individual optimization constraint comprises a maximum number of shares that can be traded for a given security in a given portfolio of said plurality of portfolios;
   c) receiving, by said computer server, a global optimization constraint, wherein the global optimization constraint is applied across an aggregate of said plurality of portfolios, and wherein the global optimization constraint comprises a maximum number of shares that can be traded for a given security in said plurality of portfolios;
   d) optimizing, by said computer server, said asset data for said each portfolio based on said individual optimization constraint creating optimized portfolio data for said each portfolio;
   e) aggregating, by said computer server, said optimized portfolio data for each portfolio creating an aggregate optimized asset data for said plurality of portfolios;
   f) determining if said aggregate optimized asset data satisfies said global optimization constraint;
   g) if said aggregate optimized asset data is determined to satisfy said global optimization constraint, outputting said optimized asset data to said electronic trading system; and
   h) if said aggregate optimized asset data is determined not to satisfy said global optimization constraint, first adjusting said individual optimization constraint based on each of said optimized portfolio data and said aggregate optimized asset data until said aggregate optimized asset data is determined to satisfy said global optimization constraint, and then outputting said optimized asset data to said electronic trading system.

2. The method of claim 1, further comprising a step of:
   optimizing said asset data based on said adjusted individual optimization constraint.

3. The method of claim 1, wherein the step of adjusting said individual optimization constraint based on said optimized portfolio data and said aggregate optimized asset data further comprises setting $M_1 = S_1 * M_{TOTAL}/S_{TOTAL}$, wherein M1 is an individual constraint, S1 is a security, $M_{TOTAL}$ is a global constraint and $S_{TOTAL}$ is an aggregate number of shares traded across all the portfolios.

4. The method of claim 1, wherein the step of adjusting said individual optimization constraint based on said optimized portfolio data and said aggregate optimized asset data further comprises setting a maximum number of shares that can be traded for each asset in said each portfolio of said plurality of portfolios during a next round of optimization equal to zero if a number of shares of each asset in said each portfolio of said plurality of portfolios traded during a previous round of optimization equals zero.

5. The method of claim 1, wherein the step of adjusting said individual optimization constraint based on said optimized portfolio data and said aggregate optimized asset data further comprises setting a maximum number of shares that can be sold for each asset in said each portfolio of said plurality of portfolios during a next round of optimization equal to zero if a number of shares of each asset bought for each security in said each portfolio of said plurality of portfolios during a previous round of optimization is greater than a number of shares of each asset sold for each security in said each portfolio of said plurality of portfolios during a previous round of optimization.

6. The method of claim 1, wherein the step of receiving said asset data further comprises:
   receiving at least one of a name of an asset, a symbol of an asset, a market price of an asset, an average price at which an asset was purchased, a number of shares of an asset in one of said plurality of portfolios, and a number of shares of an asset in said plurality of portfolios.

7. The method of claim 1, wherein the step of receiving said individual optimization constraint further comprises a step of receiving at least one constraint defining whether late comers are allowed, whether crossing is allowed, a minimum number of shares that can be traded for a given security in said plurality of portfolios, a total maximum transaction cost for all said plurality of portfolios, a maximum level of risk allowed, a minimum level of risk allowed, or a minimum level of gain allowed.

* * * * *

UNITED STATES PATENT AND TRADEMARK OFFICE
CERTIFICATE OF CORRECTION

PATENT NO. : 8,635,141 B2
APPLICATION NO. : 12/965064
DATED : January 21, 2014
INVENTOR(S) : Leonid Alexander Zosin et al.

It is certified that error appears in the above-identified patent and that said Letters Patent is hereby corrected as shown below:

In the Specification

Col. 18, line 44, "M1-3: Total Trade Cost $200" should be -- M1-3: Total Trade Cost $\leq$ $200 --.

Col. 18, line 57, "S2 = 100 Shares Traded" should be -- S3 = 100 Shares Trade --.

Signed and Sealed this
Nineteenth Day of August, 2014

Michelle K. Lee
*Deputy Director of the United States Patent and Trademark Office*